Feb. 9, 1926.
R. HUFF
1,571,949
TRANSMISSION LOCK
Filed July 2, 1921
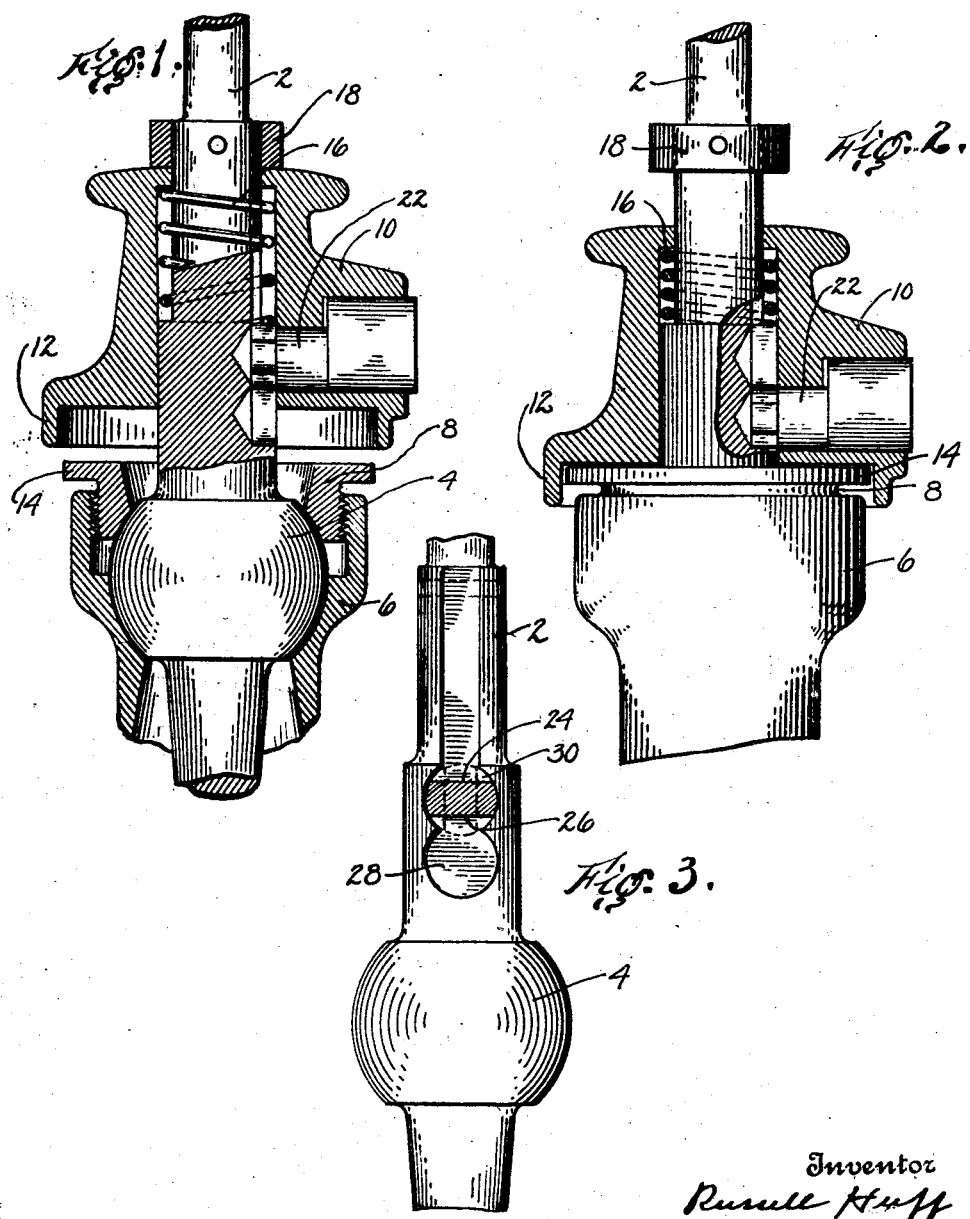
Inventor
Russell Huff
By her Attorneys
Newell & Spencer Patented Feb. 9, 1926.

1,571,949

UNITED STATES PATENT OFFICE.

RUSSELL HUFF, OF DETROIT, MICHIGAN, ASSIGNOR, BY MESNE ASSIGNMENTS, TO DODGE BROTHERS INC., A CORPORATION OF MARYLAND.

TRANSMISSION LOCK.

Application filed July 2, 1921. Serial No. 482,046.

*To all whom it may concern:*

Be it known that I, RUSSELL HUFF, a citizen of the United States, residing at Detroit, Michigan, have invented certain new and useful Improvements in Transmission Locks, of which the following is a clear, full, and exact description.

This invention relates to locks for automobiles, and more particularly to locks of the transmission lock type in which means is provided for holding the gear shift lever from movement.

In certain locks of this type, a holding or locking sleeve is mounted on the gear shift lever to slide longitudinally thereof and is arranged to engage a co-operating holding member carried by the lever housing to lock the lever in neutral position, and the invention may advantageously be employed in connection with a construction of this character. The invention is not limited, however, to such a construction but certain features thereof may be employed in connection with other transmission locking mechanisms.

One of the principal objects of the present invention is to produce a transmission lock for automobiles in which the holding member for the gear shift lever may be locked positively either in operative position or in inoperative position.

Another object of the invention is to provide a novel and improved locking device for locking the holding sleeve or other holding member for the gear shift lever in position.

With these objects in view the invention comprises the novel and improved features, constructions and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings—

Fig. 1 is a sectional view of a locking mechanism embodying the invention taken in a plane containing the axis of the gear shift lever;

Fig. 2 is a view partly in elevation and partly in section in a plane containing the axis of the gear shift lever illustrating certain of the parts in different positions from those in which they are shown in Fig. 1, and Fig. 3 is a detail view illustrating the gear shift lever in elevation and the locking bolt in section.

In the illustrated embodiment of the invention, the locking mechanism is applied to a gear shifting lever indicated at 2 which may be of the usual construction and arranged for universal movement, in the usual manner. This lever is provided with a ball shaped enlargement indicated at 4 having a universal movement in a bearing formed in the housing 6 for the lever, and in a bearing ring 8 threaded into the upper end of the housing, which holds the enlargement 4 in place in the housing 6. The lever 2 has a suitable connection at its lower end with the transmission mechanism whereby the gears are shifted by the usual movements of the lever.

The locking mechanism for the gear shifting lever 2 is preferably arranged to lock the lever in neutral position. The locking mechanism of the illustrated embodiment of the invention comprises a sleeve 10 mounted on the gear shifting lever to slide longitudinally thereof. This sleeve is recessed at its lower end to receive the upper end of the ring 8 and is provided with a flange 12 arranged to engage a flange 14 on said ring when the sleeve is in its lower position to hold the gear shifting lever from movement. The sleeve 10 is acted upon by a coiled spring 16 surrounding the gear shifting lever 2 within the sleeve and interposed between a shoulder on said sleeve and a shoulder on said lever which tends to hold the sleeve in its uppermost position shown in Fig. 2, the upper movement of the sleeve on the lever 2 being limited by a stop collar 18 mounted on the lever. When the sleeve 10 is in the position shown in Fig. 1 the flange 12 on the sleeve lies above the flange 14 on the ring 8 and the gear shifting lever 2 is free to move in any direction. When it is desired to lock the lever in neutral position, the sleeve 10 is depressed into the position shown in Fig. 2 against the action of the spring 16, thereby bringing the flange 12 into position to engage the flange 14.

Means is provided for locking the sleeve 10 either in its upper or inoperative position, or in its lower or operative position. In the present form of the invention a lock mechanism of the barrel type is provided. This lock mechanism comprises a cylindrical lock barrel 22 mounted to rotate in a bearing in the sleeve 10, the inner end of which is cut away on opposite sides thereof as indicated at 24 in Fig. 3 forming a rotatable bolt the width of which is considerably greater than the thickness thereof. The inner end of the barrel 22 is arranged to engage in a groove 26 cut in the lever 2 and extending longitudinally of the lever. This groove is provided with two enlargements 28 and 30 preferably circular in cross section and slightly larger in diameter than the diameter of the barrel 22 and with a contracted portion between the two enlargements, as clearly shown in Fig. 3, the width of the contracted portion being slightly greater than the thickness of the inner end of the barrel 22.

In the operation of the mechanism described, the sleeve 10 is normally held in its upper or inoperative position, the inner end of the barrel 22 then engaging in the upper enlargement 30 of the groove 26 and the barrel being turned so that the inner end thereof is in a position transverse to the length of the groove, as shown in full lines in Fig. 3. When the barrel 22 is in this position, the sleeve 10 is securely locked in its upper position so that it cannot be depressed into holding position, accidentally or otherwise. When it is desired to lock the transmission lever, a key is inserted in the lock for the sleeve 10 and the barrel 22 is turned so that the inner end thereof lies substantially parallel with the axis of the groove, as shown in dotted lines in Fig. 3. When the barrel 22 is turned into this position, the sleeve 10 may be depressed into holding position, the inner end of the barrel 22 passing readily through the contracted portion of the groove 26 between the enlargements 28 and 30. When the sleeve reaches its lower limiting position, the key is turned to turn the inner end of the barrel 22 into a position transverse to the length of the groove 26, thereby locking the sleeve 10 in its lower position. The lock for the barrel 22 is so constructed that the key may only be removed when the barrel 22 has been turned to locate the inner end thereof in a position transverse to the length of the groove 26. Thus, the sleeve 10 is always locked either in its upper or lower position when the key has been removed.

The sleeve 10, when its lower or holding position effectively conceals and obstructs access to the ring and so that the ring cannot be unscrewed.

The construction described is reliable in operation and is strong and durable so that it will remain in order after long continued use. Furthermore, the construction also has the advantage of simplicity, very little variation being necessary in the structure of the parts to which the locking devices are applied from the usual structure of these parts.

It is to be understood that except as defined in the claims of the present application, the invention is not limited to the particular construction and arrangement of parts of the illustrated embodiment of the invention, but that the invention may be embodied in other forms within the scope of the claims.

Having explained the nature and object of the invention and having specifically described a device embodying the invention in its preferred form, what is claimed is:

1. A transmission lock construction having, in combination, a gear shifting lever mounted for universal movement, means movable longitudinally of the lever to hold and release the lever, and a lock for said means comprising a rotatable bolt having one transverse dimension greater than another, the lever being provided with a groove to receive the bolt varying in width at different points and arranged so that the bolt when in one angular position will pass longitudinally therethrough, and when in another angular position will be held from movement longitudinally of the groove.

2. A transmission lock construction having, in combination, a gear shifting lever, means movable longitudinally of said lever to hold and release the lever, a lock for locking said means positively either in position to hold said lever stationary or in position to allow said lever freedom of movement, comprising a rotatable bolt having one transverse dimension greater than another, the lever being provided with a groove to receive said bolt having two enlarged portions and a contracted portion between the enlarged portions, arranged so that when the bolt is in a certain angular position in one of said enlarged portions it will be held from movement through the contracted portion, and when in another angular position, it may be moved from one enlarged portion of the groove, through the contracted portion, to the other enlarged portion thereof.

Signed at Detroit, Michigan, this 27th day of June, 1921.

RUSSELL HUFF.